United States Patent [19]

Baron et al.

[11] 4,044,073

[45] Aug. 23, 1977

[54] HIGH IMPACT STRENGTH BLENDS OF POLYBUTYLENE TEREPHTHALATE

[75] Inventors: Arthur L. Baron; Herbert L. Rawlings, both of New Martinsville, W. Va.

[73] Assignee: Mobay Chemical Corporation, Pittsburgh, Pa.

[21] Appl. No.: 580,400

[22] Filed: May 23, 1975

[51] Int. Cl.$^2$ .......................................... C08L 67/02
[52] U.S. Cl. ................................ 260/860; 260/40 R
[58] Field of Search ....................................... 260/860

[56] References Cited

U.S. PATENT DOCUMENTS

| | | | |
|---|---|---|---|
| 3,218,372 | 11/1965 | Okamura | 260/860 |
| 3,470,114 | 9/1969 | Siggel | 260/860 |
| 3,624,024 | 11/1971 | Caldwell | 260/40 R |
| 3,644,271 | 2/1972 | Tully | 260/41 |
| 3,751,396 | 8/1973 | Gall | 260/40 R |
| 3,833,685 | 9/1974 | Wambach | 260/860 |
| 3,835,089 | 9/1974 | Fox | 260/40 R |
| 3,855,277 | 12/1974 | Fox | 260/860 |
| 3,883,471 | 5/1975 | Stackman | 260/860 |

*Primary Examiner*—Paul R. Michl
*Attorney, Agent, or Firm*—Gene Harsh; Lawrence S. Pope; Frederick H. Colen

[57] ABSTRACT

A blend comprised of high molecular weight polybutylene terephthalate and up to about 20 wt.% of an aromatic polycarbonate resin wherein the mixture has a drop dart impact strength in excess of about 60 foot-pounds is prepared by intimately mixing the components, one of which is powdered. The polybutylene terephthalate has an intrinsic viscosity of at least about 0.95. The blend will tolerate the addition of up to 20 wt.% of a conventional flame retardant package such as decabromodiphenyl oxide and antimony trioxide while maintaining the 60 foot-pound minimum drop dart impact strength. The blend can achieve impact strengths in excess of 90 foot-pounds even when it contains flame retardant additives if the polybutylene terephthalate is blended in powder form.

The invention also concerns a method of blending a high molecular weight polybutylene terephthalate with an aromatic polycarbonate to produce a high impact strength resin which has the ability to incorporate other additives while maintaining a high impact strength. The method includes blending one of the polybutylene terephthalate or the polycarbonate in powdered form.

19 Claims, No Drawings

HIGH IMPACT STRENGTH BLENDS OF POLYBUTYLENE TEREPHTHALATE

FIELD OF THE INVENTION

This invention relates to a thermoplastic resin blend having a high drop dart impact strength, an increased melt viscosity and the ability to tolerate significant amounts of other additives, particularly a flame retardant package while retaining superior impact properties.

DESCRIPTION OF THE PRIOR ART

Thermoplastic resins including aromatic polycarbonates and alkylene terephthalate polyesters are well known for use as molding resins, films, and fibers. Such resins have found acceptance in the market place for a variety of purposes including use as engineering materials. They display among other properties attractive tensile strength, oxidative stability and in the unmixed state, high impact strength as measured by the drop dart impact test (ASTM D 3029 or its equivalent). Unfortunately, when thermoplastic polyester resins are blended with significant amounts of additives in order to achieve other desirable properties, they tend to suffer a significant diminution of their impact strength. For example, while polybutylene terephthalate having an intrinsic viscosity in excess of about 0.8 has a drop dart impact strength in excess of about 100 foot-pounds when it is blended with about 15 wt.% of a flame retardant package (consisting of 5 wt.% of antimony trioxide and 10 wt.% decabromodiphenyl oxide) its impact strength drops to less than about 3 foot-pounds. Thus, for example, it has not been possible to achieve a polyblend using polybutylene terephthalate which has both good flame resistance (as measured by the method set out in Underwriter's Laboratories Bulletin 94) and superior impact strength. The foregoing situation is exemplified by the fact that even the most recently developed polyblends of fire retardant polycarbonates and polyesters as disclosed in Wamback U.S. Pat. No. 3,833,685 exhibit drop dart impact resistance of no higher than about 30 foot-pounds (350 inch-pounds).

It is also desirable to blend polybutylene terephthalate with additives to increase its melt viscosity. While the low melt viscosity of polybutylene terephthalate is advantageous in that it allows more rapid mold filling and other beneficial operating parameters, it is so low that it also presents some problems in molding such as drooling and stringing. Drooling occurs when there is not a clean shut off at the nozzle after an injection mold cycle requiring an independent operation to clean the nozzle. Stringing occurs when there is not a clean cut off at the runner and an elongated thread of material is formed as the part is removed from the mold. This thread or string may then be trapped in the mold and mar the next part being formed.

It is further desirable to blend polybutylene terephthalate with additives to broaden its melting range. It has a fairly high degree of crystallinity which is advantageous in many aspects but which means it has a fairly narrow temperature range over which it freezes or melts. It is desirable to broaden its melting range to allow more tolerance in temperature control and thus avoid premature freezing in molding.

Finally, in some applications it is desirable to increase the heat distortion temperature of the polybutylene terephthalate. This is normally done in most polymers by means of additives which are more heat resistive than the base polymer.

Unfortunately, it has not been possible to blend significant amounts of these desirable additives with polybutylene terephthalate and still maintain its excellent drop dart impact strength.

An object of this invention is the provision of a blend of polybutylene terephthalate and aromatic polycarbonate having superior impact resistance and a tolerance for other additives. A further object of this invention is the provision of a polybutylene terephthalate blend having flame retardancy and superior impact resistance. Yet another object of the present invention is the provision of a polymer blend comprising primarily polybutylene terephthalate having a drop dart impact resistance in excess of 60 foot-pound and a flame resistance of VO (Underwriter's Laboratory Bulletin 94).

SUMMARY OF THE INVENTION

The polyblend of the present invention comprises a mixture of about 10 to 20 wt.% aromatic polycarbonate with polybutylene terephthalate having an intrinsic viscosity in excess of about 0.95. At least on of the polybutylene terephthalate and the aromatic polycarbonate is blended in highly comminuted form. The blend may also contain up to about 20 wt.% of a flame retardant package. This package typically contains a bromine compound in sufficient amount to provide about 3.5 to 10 wt.% of bromine and an antimony compound in sufficient amount to provide about 3 to 8 wt.% of antimony. The blend may also contain typical additives such as stabilizers, mold release agents, nucleating agents and pigmenting agents.

The blend may be produced by comminuting either the polybutylene terephthalate or the polycarbonate, preferably the polybutylene terephthalate and most preferably both. Alternatively natively either resin may be provided in powdered form. The resins are then mechanically mixed and extruded. Other additives such as a flame retardant package can be added to this mechanical mixture or they may be master-batched (mixed in concentrated form into the melt) in the polycarbonate before mixture.

DETAILED DESCRIPTION OF THE INVENTION

The polybutylene terephthalate can be produced by the process taught in U.S. Pat. No. 2,465,319 to Winfield et al. It is prepared by heating together terephthalic acid and an excess of tetramethylene glycol at a temperature between 220° and 240° C and thereafter heating the reaction mixture in the absence of air and presence of nitrogen or other inert gas for some hours until a desired intrinsic viscosity is reached. The resin can then be heated under vacuum to remove by-products. For the purposes of the present invention the polybutylene terephthalic polyester should have an internal viscosity of at least about 0.95 and preferably between 1.20 and 1.30. As is well known, intrinsic viscosity is determined as an indication of the more difficultly measurable molecular weight of condensation polymers and is defined as:

$$\text{Limit}(nsp/C, \text{ as } C \text{ approaches zero})$$

where $nsp$ is the viscosity of a dilute orthochlorophenol solution of the polyester divided by the viscosity of the orthochlorophenol solvent per se measured in the same units at the same temperature, and $C$ is the concentration in grams of the polyester per 100 cc of solution, as is set forth in the specification, column 3 of U.S. Pat. No., Izard et al. U.S. Pat. No. 2,597,643.

The thermoplastic aromatic polycarbonates useful in preparing the polyblend compositions of this invention may be any of those taught by U.S. Pat. No. 3,028,365 to Schnell et al. Included among these polycarbonates are those having the recurring structural units of the formula

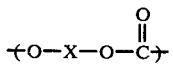

wherein
X is

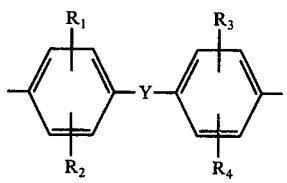

$R_1$ to $R_4$ represent hydrogen atoms, alkyl radicals, with 1-4 carbon atoms or halogen atoms and are the same or different, Y represents a single bond, an alkylene or alkylidene radical with 1-7 carbon atoms, a cycloalkylene or cycloalkylidene radical with 5-12 carbon atoms, —O—, —S—, —CO—, —SO—, —SO$_2$—, or a radical of the formulae

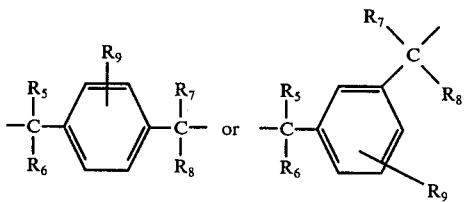

$R_5$ to $R_8$ represent alkyl radicals with 1-4 carbon atoms, and $R_9$ represents hydrogen, chlorine or bromine.

Preferred polycarbonates are those wherein the linking Y is a methylene radical, a propylidene radical, a cyclohexylene radical, a cyclohexylidene radical, a radical of the formula

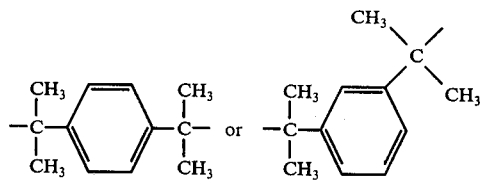

Especially preferred polycarbonates are those based upon 2,2-bis-(4-hydroxyphenyl)propane monomers and such monomers wherein the phenyl rings are substituted by halogen or $C_1$-$C_4$ alkyl. Such polycarbonates may have the reoccurring structural formula

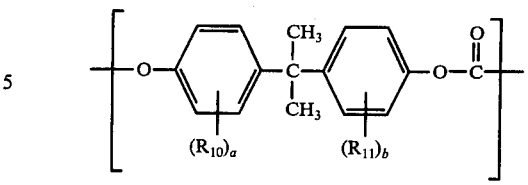

wherein $R_{10}$ and $R_{11}$ represent chlorine, bromine or a $C_1$-$C_4$ alkyl and $a$ and $b$ are both integers between 1 and 4 inclusive. Suitable polycarbonates generally have a melt index of 0.1 to 25gm/10 minutes at 527° F (as measured under ASTM Standard D 1238). Also included as suitable aromatic polycarbonates are branched polycabonates such as those described in U.S. Pat. No. Re. 27,682 which have melt indexes in this range.

The polybutylene terephthalate is commercially available in the form of pellets. However, it may also be obtained in the form of powder. The polycarbonates may be obtained either as pellets or a light fluffy powder. The production of such a powder is described in *Polycarbonates* by Christopher and Fox, published in 1962 by Reinhold Printing Corportion of New York. Polycarbonates based upon 2,2-bis(-4-hydroxyphenyl)-propane with and without nuclear substitution on the phenyl rings are commercially available in the form of pellets or powder from Mobay Chemical Corporation under the trade name MERLON®.

The blends of the present invention comprise an intimate admixture of polybutylene terephthalate and 10 to 20 wt. % of aromatic polycarbonate, based on the total weight of the blend wherein one of these components is in highly comminuted form at the time the admixture is formed. The mesh size of the comminuted component should be no coarser than about 10 mesh, a practical range being about 10 to 200 mesh, preferably about 20 to 100 mesh. It is especially preferred that the comminuted component have a particle size of less than about 50 mesh. Either of these two components may be comminuted but it is preferred that the polybutylene terephthalate be in comminuted form. It is especially preferable if both the polycarbonate and the polybutylene terephthalate be in comminuted form at the time the admixture is formed.

The resins of the present invention may be prepared by mechanically mixing the polybutylene terephthalate with about 10 to 20 wt.% of the polycarbonate based on the total weight of the resin and then extruding the mixture. Other additives may also be included in the mixture or master batched into one of the components. If additives are to be master batched they are preferably master batched into the polycarbonate.

In a preferred embodiment the resin of the present invention may also contain a flame retardant package. A preferred flame retardant package is the combination of an aromatic bromine compound and an antimony containing compound. The bromine compound should be present in an amount sufficient to provide about 3.5 to 10 wt.%, preferably about 5 to 8 wt.% bromine based on the total weight of the resin. The antimony compound should be present in sufficient amount to provide about 3 to 8 wt.%, preferably about 4.5 to 5.5 wt.% antimony based on the total weight of the resin. Suitable aromatic bromine compounds include those described in U.S.Pat. No. 3,751,396 which is incorporated herein by reference. Examples of such compounds are decabromodiphenylether, octabromodiphenyl ether, pentabromoethyl benzene, hexabromobenzene, 2,2-bis-(3,5-dibromo-4-hydroxyphenyl)propane, tetrabromophthalic anhydride, octabromodiphenyl, decabromobiphenyl and 3,5,3′,5′-tetrabromobiphenyl ether. Also suitable are aromatic carbonate oligomers having a degree of polymerization between 2 and 20 and bromine substituents on the phenylene rings which are described in U.S. Pat. No. 3,833,685 incorporated herein by reference. Suitable antimony compounds include both inorganic and organic compounds such as those described in U.S. Pat. No. 3,833,685 the choice of a particular compound being primarily a matter of economics. Especially preferred compounds are decabromodiphenylether and antimony trioxide.

The flame retardant package may be incorporated into the resin by mechanically mixing it with the polycarbonate and the polybutylene terephthalate and extruding the mixture. Alternatively, the components of the flame retardant package or some of them may be master batched into either the polybutylene terephthalate or the polycarbonate, preferably the later. In the case of the decabromodiphenyl ether, antimony trioxide flame retardant package each of the components of the package may be added as a separate powder to the polycarbonate polybutylene terephthalate mechanical mixture or they may be added together as an intensely blended powder permix. Alternatively, either the decabromodiphenyl ether or the antimony trioxide or both may be master batched into either the polybutylene terephthalate or preferably the polycarbonate. The master batching comprises forming a mechanical mixture of the additive to be incorporated, e.g. decabromodiphenyl ether or antimony trioxide, and the carrier material, e.g. polycarbonate or polybutylene terephthalate and then extruding the mixture. The pellets so produced can than be utilized in preparing the resins of the present invention.

The resins of the present invention may be produced by extruding the mechanical mixtures discussed hereinabove at most extrusion conditions suitable for pure polybutylene terephthalate. In general, polybutylene terephthalate may be extruded at temperatures between about 220° and 280° C and temperatures above about 280° C should be avoided because degradation of the polymer may occur. Those skilled in the art well recongnize that the presence of the polycarbonate and additives, such as a flame retardant package will increase the viscosity of the polybutylene terephthalate, thus requiring that either the temperature or the pressure or both be increased relative to the conditions required for successful extrusion of unalloyed polybutylene terephthalate.

The following examples illustrate various features and embodiments of the present invention. They are not intended to be limiting but rather the scope of the invention is defined by the claims.

In the first set of experiments the following formulation which produces resins which achieve a VO rating in the Underwriter's Laboratory Bullentin 94 test, was used to demonstrate the criticality of using either the polycarbonate or the polybutylene terephthalate in comminuted form.

| FORMULATION | |
|---|---|
| Ingredient | Weight Percent |
| PBT* (IV 1.25 ± 0.05) | 69.95 |
| Polycarbonate** | 15.40 |
| $Sb_2O_3$ | 5.00 |
| DBDPO (decabromodiphenyl oxide) 9.60 | |

*Polybutylene terephthalate resin supplied by Goodyear under the designation Vituf® 4884; note that reduction to powder form reduces the apparent I.V. by about 0.20.
**Bisphenol-A polycarbonate resin supplied by Mobay Chemical Corporation under the designation M-50 Merlon®; having a melt index of 3-6 gm/10 minutes at 572° F.

Pellets chopped from extruded strands of each exemplary product are injected molded to round discs 4 inches in diameter by 125 mils in thickness. These discs are subject to the impact of a 10.6 pound dart having a 1 inch diameter nose and (other than the diameter of the nose) conforming to ASTM test D3029. In all examples, the FORMULATION set forth above was employed except where specifically noted. In those experiments in which the polycarbonate is master blended (MB) with either the $Sb_2O_3$ or the DBDPO the master blend is produced in the form of granules or pellets.

TABLE I

| Expt. No. | PBT | PC | DBDPO | $Sb_2O_3$ | Dart Drop (ft. lb.) | Pdt. I.V. | PBT Feed IV |
|---|---|---|---|---|---|---|---|
| 1 (comparison) | G | G | P | P | 3.2 | 0.78 | 1.15 |
| 2 | P | G | P | P | 105 | | 0.98 |
| 3 | P | P | M | M | 106 | 0.73 | 0.98 |
| 4 | P | MB | MB | P | 107 | 0.70 | 1.08 |
| 5 | G | P | P | P | 64 | 0.74 | 1.15 |
| 6 (comparison) | G | MB | MB | P | 24 | | 1.15 |
| 7 (comparison) | G | MB | P | MB | 3.5 | | 1.3 |
| 8 (comparison) | G | G | M | M | 4.6 | | 1.3 |
| 9 (comparison) | P | P | M | M | 6.3 | 0.51 | 0.8 | wherein
P = Powder approximately 60 mesh;
G = Granules (Pellets) approximately ⅛″ × ⅛″;
MB = Masterbatch in PC;
M = Intensely Mixed Blend (PowderPremix)

It is surprising that the presence of 15 wt. % of polycarbonate, which itself might be expected to lower the dart drop impact strength of the polybutylene terephthalate (PBT), is able to increase the tolerance of the PBT to the extent that drop dart impact strengths in excess of 60 foot-pound are achieved in spite of the high (15 wt.%) particulate additive present (at the extrusion conditions used, 540° to 470° F reverse profile, the DBDPO because of its high melting point can be considered solid in those experiments in which it is not master blended in the polycarbonate). Experiment 9 demonstrates that the I.V. of the PBT must be at least about 0.95. Experiment 5 demonstrates that while the invention can be practiced by using the polycarbonate in comminuted form superior results are achieved when the PBT is in comminuted form.

In the following experiment, the same starting materials were used as the Experiment 1. The resin was extruded a number of times in an attempt to improve the mixing and the impact properties.

| | Experiment 10 (comparison) | |
|---|---|---|
| No. of Re extrusions | I.V. in dl/gm of resin | Drop Dart Impact (ft-lb) |
| 0 | .873 | 2.7 |
| 1 | — | 10.5 |
| 2 | .827 | 41.2 |
| 3 | .80 | 49.5 |

It is evident that impact strengths achieved by the present invention cannot be achieved by re-extrustion of an initial pellet mixture. In addition, it is noted that the intrinsic viscosity of the resin is reduced after each extrusion step probably indicative of a degradation of the PBT. PBT displays non-Newtonian flow and thus absorbs work on extrusion which may degrade the polymer.

EXPERIMENT 11

The following formulation was extruded and then injected molded and then drop dart impact as described hereinabove.

| | |
|---|---|
| PBT (nominal I.V. 1.25 ± .05) ground to 60 mesh | 71 wt. % |
| Polycarbonate (melt flow 3-6 gm/10 minutes) ground to 60 mesh | 10.6 wt. % |
| $Sb_2O_3$ | 5.0 wt. % |
| Tetrabromobisphenol A polycarbonate (carbonate oligomer based on 2,2-bis-(3,5-dibromo-4-hydroxyphenyl)propane with a polymerization of about 4), powder | 13.4 wt. % |

A drop dart impact strength of 94.3 foot-pound was achieved.

When a similar formulation was prepared without comminuting either the PBT or the polycarbonate a drop dart impact of only 29 ft-lb was achieved.

EXPERIMENT 12

The effect of pigment additives was tested using the polycarbonate and PBT described in Experiments 1 through 8.

| Composition | Drop Dart Impact (ft-lb) |
|---|---|
| 18 wt. % polycarbonate in PBT | >107 |
| same + 2 wt. % $TiO_2$ | >107 |
| Formulation of Experiment 3 | 106 |
| same + 2 wt. % $TiO_2$ | 102 |
| same + 2 wt. % $TiO_2$ (different source) | 100 |
| 15.4 wt. % polycarbonate + 14.6 wt. % $TiO_2$ in PBT | 8.9 |

It is quite surprising that the polycarbonate not only imparts a tolerance to $TiO_2$ to the PBT but that it does so in systems containing 15 wt.% of other additives ($Sb_2O_3$ and DBDPO). Of course, $TiO_2$ is known to be especially detrimental to the impact strength of resins into which it is incorporated so that it could be expected that even polycarbonate modified PBT would have less tolerance of it as compared to other additives. Since a loading of 2 wt.% $TiO_2$ would be quite high for most pigmentation applications and since $TiO_2$ is the most detrimental (in terms of impact strength) of the pigmenting agents commonly used in thermoplastic resins, it is expected that the resins of the present invention may be readily pigmented while maintaining drop dart impact strength in excess of about 60 foot-pound.

EXPERIMENT 13 (COMPARISON)

Experiment 3 was repeated except that the polycarbonate was replaced by 60 mesh powder of polyethylene having a melt index of 5 at 190° C and a 2160 g load; polysulfone having a melt index of 6.5 at 650° F and 44 psi; and polyphenyl sulfide having a melt index of 1000 gm/10minutes at 600° F and 2160 g load.

| | Drop Dart Impact |
|---|---|
| polycarbonate | 104 ft-lb |
| polyethylene | 6 ft-lb |
| polysulfone | 5 ft-lb |
| polyphenyl sulfide | 2 ft-lb |

It thus appears that polycarbonate appears to have the unique property of allowing polybutylene terephthalate to incorporate significant quantities of additives while maintaining a drop dart impact strength in excess of 60 foot-pound.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic resin having a drop dart impact resistance of at least about 60 foot-pounds and comprising an intimate mechanical blend of:
   a. 60 to 90 wt.% of polybutylene terephthalate with an intrinsic viscosity of at least about 0.95,
   b. 10 to 20 wt.% of an aromatic polycarbonate having a melt index of 0.1 to 25 gm/10 min. at 572° F (ASTM - D-1238); and
   c. 0 to 20 wt.% of a flame retardant package comprising
      i. an aromatic bromine compound present in sufficient amount to provide about 3.5 to 10 wt.% bromine based on the total weight of the resin, and
      ii. an antimony containing compound present in sufficient amounts to provide about 3 to 8 wt.% of antimony based on the total weight of resin,
   at least one of said polybutylene terephthalate and said polycarbonate being in the form of a powder at the time the blend is produced.

2. The resin of claim 1 wherein the aromatic polycarbonate has the following reoccurring structural formula:

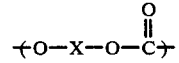

wherein X is

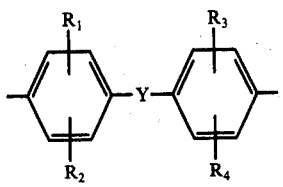

$R_1$ to $R_4$ represent hydrogen atoms, alkyl radicals, with 1-4 carbon atoms or halogen atoms and are the same or different, represents a single bond, an alkylene or alkylidene radical with 1-7 carbon atoms, a cycloalkylene or cycloalkylidene radical with 5 to 12 carbon atoms, —O—, —S—, —CO—, —SO—, —SO$_2$— or a radical of the formulae

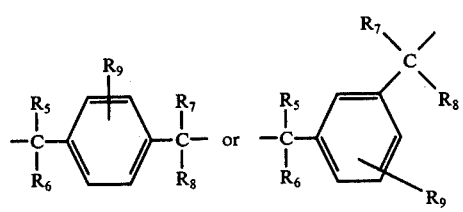

$R_5$ to $R_8$ represents alkyl radicals with 1 to 4 carbon atoms; and $R_9$ represents hydrogen, chlorine or bromine.

3. The resin of claim 2 wherein Y is a methylene radical, a propylidene radical, a cyclohexylene radical, a cyclohexylidene radical,

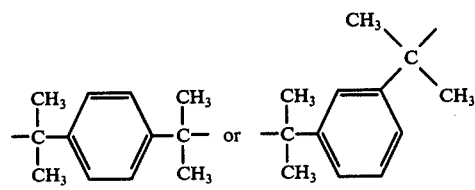

4. The resin of claim 1 wherein the polycarbonate has the following recurring structural formula

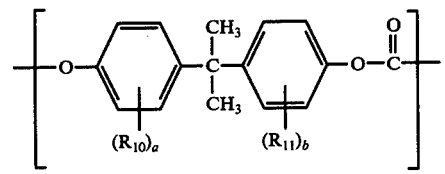

wherein $R_{10}$ and $R_{11}$ represent chlorine, bromine or a 1-4 carbon alkyl radical and a and b are integers between 1 and 4 inclusive.

5. The resin of claim 1 containing 10 to 20 wt.% of a flame retardant package comprising
a. an aromatic bromine compound present in sufficient amount to provide about 5 to 8 wt.% bromine based on the total weight of the resin, and
b. an antimony containing compound present in sufficient amount to provide about 4.5 to 5.5 wt.% antimony based on the total weight of the resin.

6. The resin of claim 5 wherein the bromine compound is decarbromodiphenyl ether and the antimony compound is antimony trioxide.

7. The resin of claim 6 which contains up to about 2 wt.% of pigmentating agents.

8. The resin of claim 7 wherein the pigmentating agent includes titanium oxide.

9. The resin of claim 1 wherein the powdered component has a particle size less than about 10 mesh.

10. The resin of claim 9 wherien the powdered component has a particle size of about 10 to 200 mesh.

11. The resin of claim 10 wherein the powdered component has a particle size of about 20 to 100 mesh.

12. The resin of claim 1 wherein both the polycarbonate and the polybutylene terephthalate are in the form of a powder of about 10 to 200 mesh at the time the blend is formed.

13. The resin of claim 1 wherein the polybutylene terephthalate is in the form of a powder of about 10 to 200 mesh at the time the blend is formed.

14. The resin of claim 1 wherein the polycarbonate has the following reoccurring structural formula

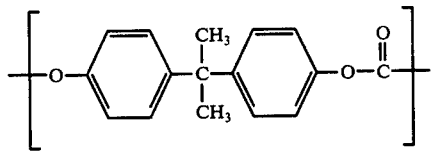

and a melt flow at 572° F of about 3 to 6 gm/10 minutes.

15. The resin of claim 14 wherein the aromatic bromine compound is decabromodiphenylether and the antimony containing compound is antimony trioxide.

16. The resin of claim 14 wherein the aromatic bromine compound is a carbonate oligomer having 2 to 20 repeating units of the formula

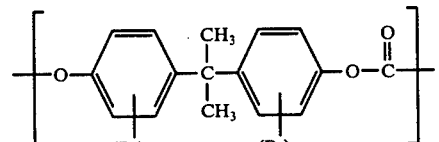

wherein a and b are integers between 1 and 4 inclusive.

17. A process for the production of a high impact strength molding resin with a drop dart impact strength greater than about 60 foot-pound comprising forming an intimate blend of
a. 80 to 90 wt.% of polybutylene terephthalate having an intrinsic viscosity above about 0.95 and
b. 10 to 20 wt.% of an aromatic polycarbonate having a melt index of 0.1 to 25 gm/10 min. at 572° F (ASTM D-1238) wherein at least one of the components is blended in powdered form.

18. A method of preparing a high impact strength thermoplastic molding resin with a drop dart impact resistance of at least about 60 foot-pounds comprising blending
a. 60 to 90 wt. % of polybutylene terephthalate with an intrinsic viscosity of at least about 0.95,
b. 10 to 20 wt. % of an aromatic polycarbonate having a melt index of 0.1 to 25 gm/10 at 572° F (ASTM D-1238), and
c. 0 to about 20 wt. % of a flame retardant package comprising i. an aromatic bromine compound present in sufficient amount to provide 3.5 to 10 wt. % of bromine based on the total weight of the resin, and
ii. an antimony containing compound present in sufficient amount to provide about 3 to 8 wt. % of antimony based on the total weight of the resin, wherein one of the polybutylene or the polycarbonate is blended in powdered form.

19. The process of claim 18 wherein the powdered component has a particle size no greater than about 10 mesh.

* * * * *